(12) United States Patent
Li

(10) Patent No.: US 6,761,584 B2
(45) Date of Patent: Jul. 13, 2004

(54) MAINBOARD HAVING A SELECTIVE CONNECTION COM/VGA JACK LAYOUT

(75) Inventor: Yu-Pei Li, Hsin-Tien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 75 days.

(21) Appl. No.: 10/284,377

(22) Filed: Oct. 31, 2002

(65) Prior Publication Data

US 2004/0087208 A1 May 6, 2004

(51) Int. Cl.[7] .............................................. H01R 13/60
(52) U.S. Cl. ...................... 439/540.1; 439/55; 710/301
(58) Field of Search ................................ 439/55, 540.1, 439/954; 710/301, 305

(56) References Cited

U.S. PATENT DOCUMENTS 5,852,725 A * 12/1998 Yen ............................ 710/301
5,993,251 A * 11/1999 Brown et al. ............ 439/540.1
6,206,724 B1 * 3/2001 Leung ...................... 439/540.1
6,438,637 B1 * 8/2002 Chen ........................... 439/55

* cited by examiner

Primary Examiner—P. Austin Bradley
Assistant Examiner—Briggitte R. Hammond
(74) Attorney, Agent, or Firm—Birch, Stewart, Kolasch & Birch, LLP

(57) ABSTRACT

A mainboard having a selective connection COM/VGA jack layout includes a specific area for connecting different jack terminals to connect peripheral devices. The specific area includes two different sets of jack layouts to form a COM port jack layout and a VGA port jack layout laid in a juxtaposed manner. Manufacturers or designers may select to connect a COM port jack terminal or a VGA port jack terminal based on requirements (such as whether with VGA ONBOARD or not) so that only one type of mainboard is needed. Production cost may be reduced and production process is simpler.

7 Claims, 7 Drawing Sheets

MAINBOARD HAVING A SELECTIVE CONNECTION COM/VGA JACK LAYOUT

FIELD OF THE INVENTION

The present invention relates to a mainboard that has a selective connection COM/VGA jack layout and particularly a mainboard that enables designers or manufacturers to selectively connect a COM jack terminal or a VGA port terminal for plugging a display device.

BACKGROUND OF THE INVENTION

In order to meet market demands, at present the design of computer mainboard 1 can be categorized in two types (as shown in FIGS. 1, 2, 3 and 4) based on technical sophistication of professionals and novices to offer different connection of peripheral devices (such as display cards, audio effect cards, etc.). One type of the mainboard 1 includes VGA display card functions (built-in image), and another type does not have the VGA display card functions (built-in image). However these two types of mainboard 1 all have a connection area designed according to the universal FLEX-ATX/MICRO-ATX/ATX specifications for connecting different port jack terminals. For instance, the connection area may include a PS2 port connection area 2, a USB port connection area 3, a serial port connection area 4, a parallel port connection area 5, a specific area 6, a MIDI/GAME port connection area 7 and an audio socket connection area 8.

The design difference of the two types of mainboard 1 mentioned above is that for the mainboard 1 that does not have the VGA display card functions (as shown in FIG. 3), designers may directly connect a COM2 jack terminal 63 on the specific area 6 of the mainboard 1. For the other type of mainboard 1 that has VGA display card functions, designers may directly connect the jack terminal 64 of the display device in the specific area 6 (as shown in FIG. 4). As a result, there are two different specifications of mainboard 1. Manufacturers have to produce two different specifications of mainboard 1 for users to choose. Thus production cost is higher. It is because the size of the specific area 6 defined according to the existing universal specifications allows only the COM2 jack terminal 63 or the VGA jack terminal 64 to connect on the same mainboard 1, and the jack panel of the mainboard 1 cannot accommodate another set of jack terminal. To increase the size of the jack panel to house an additional set of jack terminal will result in design alteration of the casing for the mainboard. And the circuitry on the mainboard also has to be redesigned; This will incur significant cost increase.

Moreover, there are many computer peripherals to couple with the COM port, such as mouse, modem, serial printer, terminal device, etc. When users choose the mainboard 1 with VGA display card (built-in image) functions, the VGA jack terminal 64 replaces the COM2 jack terminal 63. However, there is only one COM1 jack terminal 42. It creates a lot of problems when users want to upgrade the computer or expand the peripherals in the future. To improve the situation, manufacturers have to allocate an additional COM2 jack layout 9 on the blank area of the mainboard 1 and to connect the jack layout 9 to a retain board of the jack panel through a serial port flat cable. Such an approach further increases the production cost and process of the mainboard 1.

SUMMARY OF THE INVENTION

Therefore the primary object of the invention is to resolve the aforesaid disadvantages. The invention provides a mainboard that enables designers or manufacturers to select directly connecting a COM2 jack terminal or a VGA jack terminal for a display device.

Another object of the invention is to enable manufacturers or designers to design only one type of mainboard to reduce production cost and process.

A further object of the invention is to enable the COM port jack layout to directly couple with a serial port flat cable when the VGA port jack terminal is selected so that there is no need to allocate an additional COM2 jack layout on the blank area of the mainboard to further reduce the production cost of the mainboard.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 5:
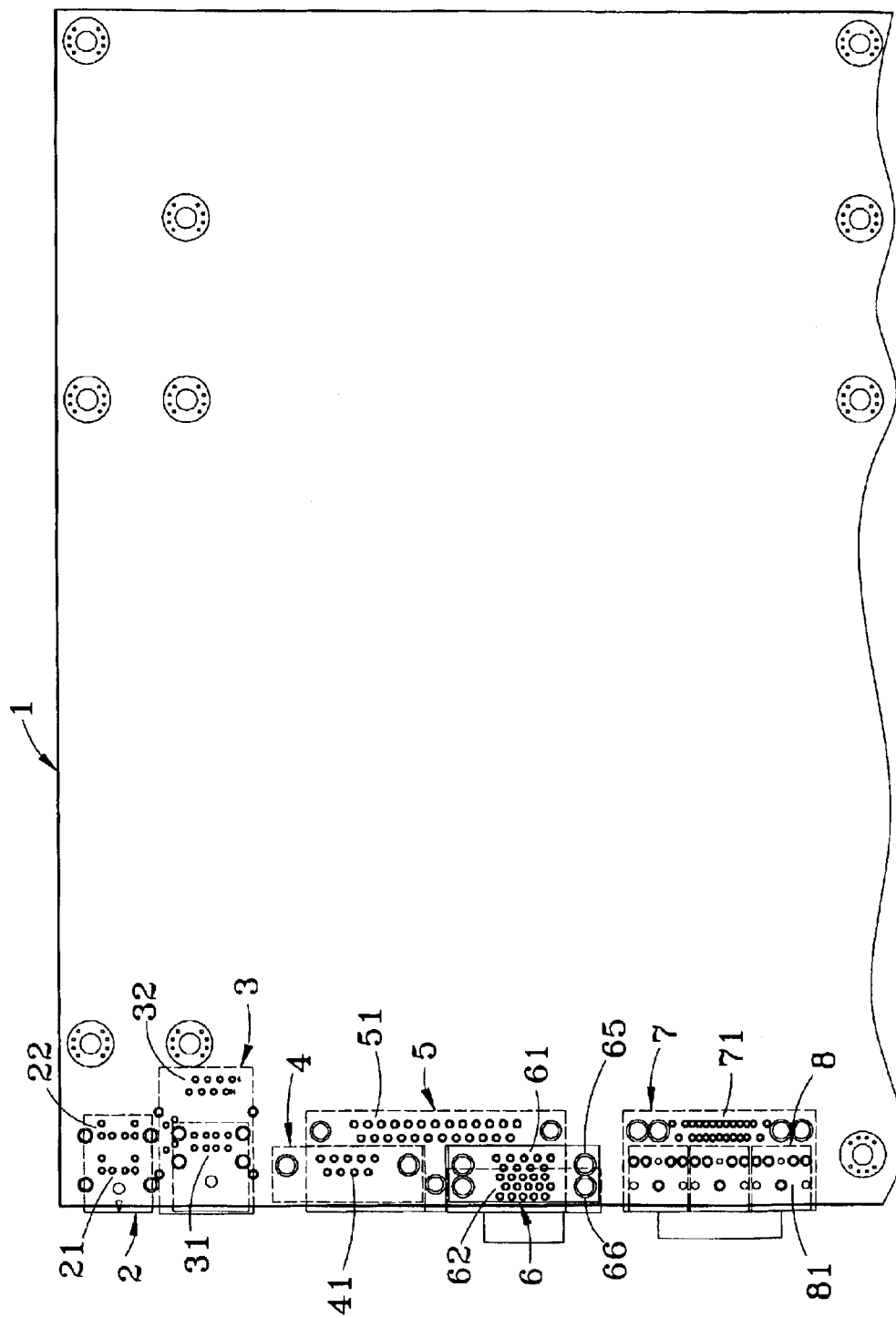
FIG. 5 is a schematic view of the mainboard of the invention.
Figure 6:
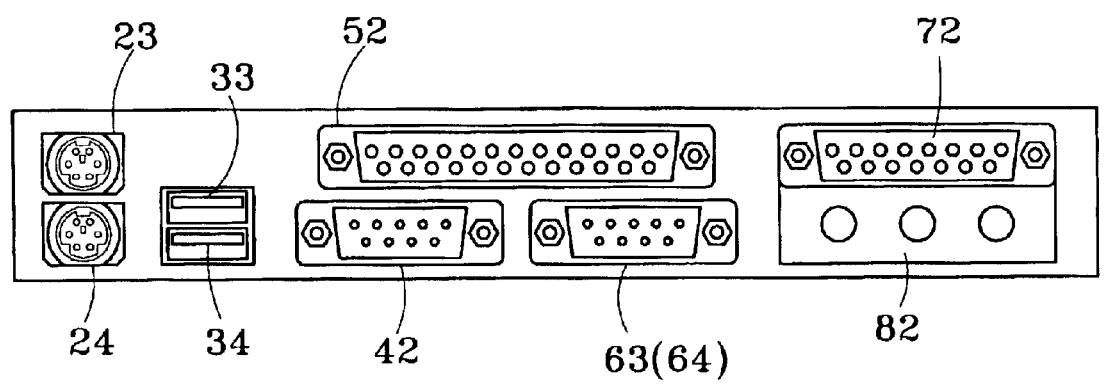
FIG. 6 is a schematic view of the mainboard face panel of the invention.
Figure 7:
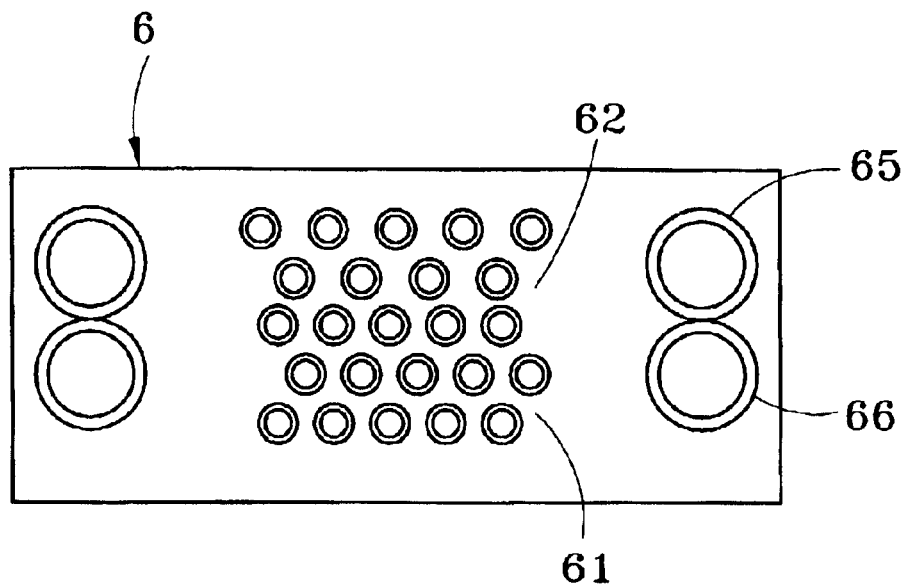
FIG. 7 is a fragmentary enlarged view of FIG. 5.

Refer to FIGS. 5, 6 and 7 for the mainboard of the invention that may be adopted for selective connection with a COM/VGA jack layout. The mainboard 1 mainly includes a specific area 6 which has a redesigned jack layout to enable the specific area 6 to connect two or more jack terminals of different ports so that producers can greatly reduce the production cost of the mainboard.

The specific area 6 on the mainboard 1 is divided and defined in a plurality of connection areas according to the universal FLEX-ATX/MICRO-ATX/ATX specifications for connecting jack terminals. The area includes a PS2 port connection area 2, a USB port connection area 3, two serial port connection areas 4, a parallel port connection area 5, a MIDI/GAME port connection area 7 and an audio socket connection area 8 (the number of the areas may increase or decrease depending on the built-in function of the mainboard). The specific area 6 of the invention is defined targeting one of the serial port connection areas. Wherein, the PS2 port connection area 2 includes two sets of jack layouts 21 and 22 made according to the MINI-DIN-6 PS2 specification. The jack layouts 21 and 22 may connect respectively to jack terminals 23 and 24 of a mouse and a keyboard.

The USB port connection area 3 includes two sets of identical jack layouts 31 and 32 for connecting respectively two sets of USB jack terminals 33 and 34.

The serial port connection area 4 is one set of jack layout 41 in DB-9 serial port specification compatible to NS16C550A for connecting a serial port jack terminal 42 of a mouse, modem, serial printer or terminal.

The parallel port connection area 5 is one set of jack layout 51 conformed to the SPP/ECP/EPP DB-25 parallel port specification for connecting a jack terminal 52 of a key-pro or parallel printer.

The specific area 6 consists of two sets of juxtaposed and different jack layouts 61 and 62, and may connect a COM2 jack terminal 63 or a VGA jack terminal 64 for a display device depending on design requirements. On two sides of the jack layouts 61 and 62, there are respectively two sets of grounding connection contacts 65 and 66 connecting to the jack terminals 63 or 64 for preventing the jack terminals 63 and 64 from being affected by Electromagnetic Interference, (EMI) during data transmission.

The MIDI/GAME port connection area 7 has one set of jack layout 71 for connecting a MDI/GAME jack terminal 72. The audio socket connection area 8 has three sets of jack layouts 81 for connecting jack terminals 82 of a sound card to output and input sound, and perform microphone function.

Figure 1:
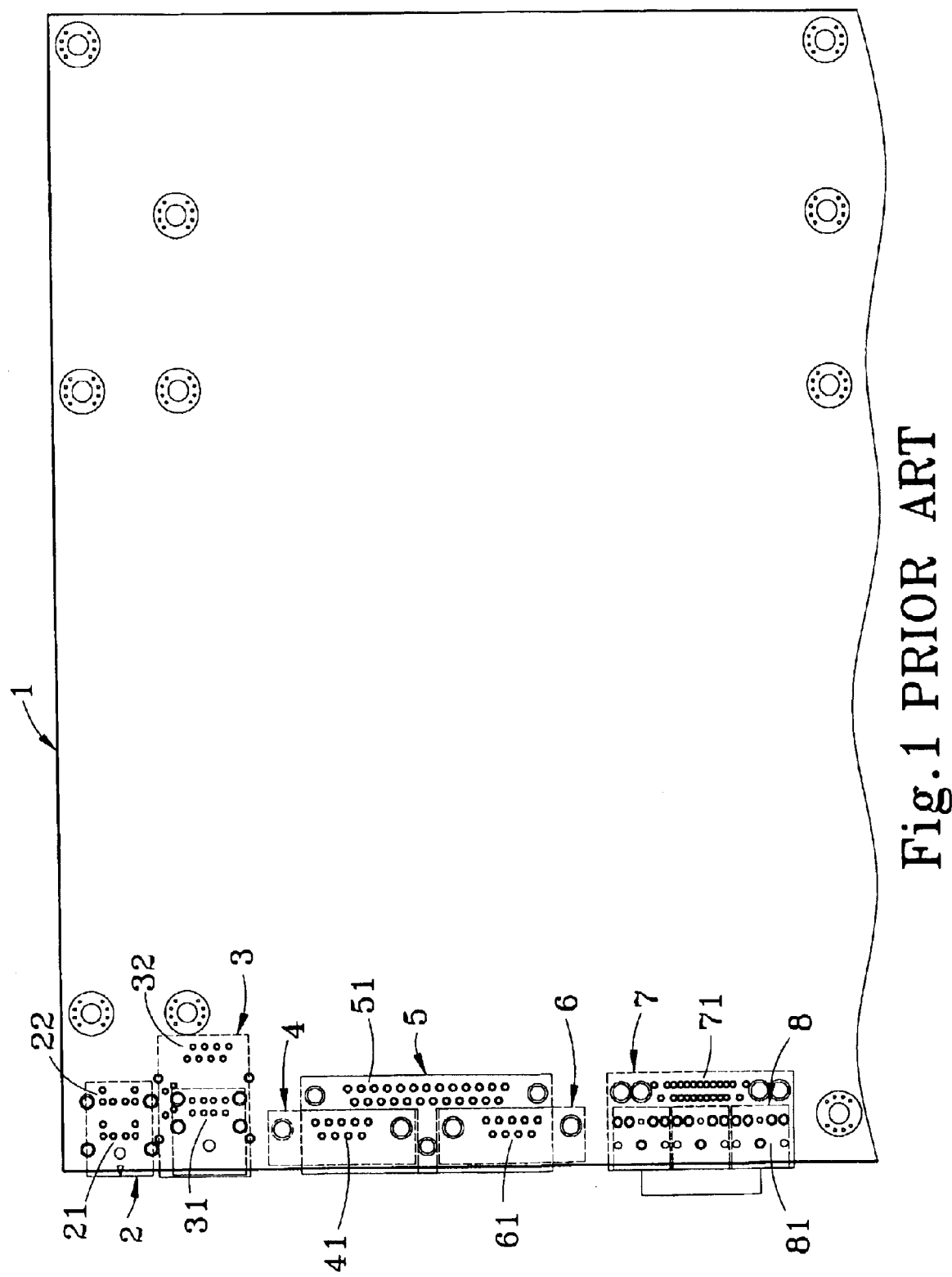
FIG. 1 is a schematic view of a conventional mainboard.
Figure 2:
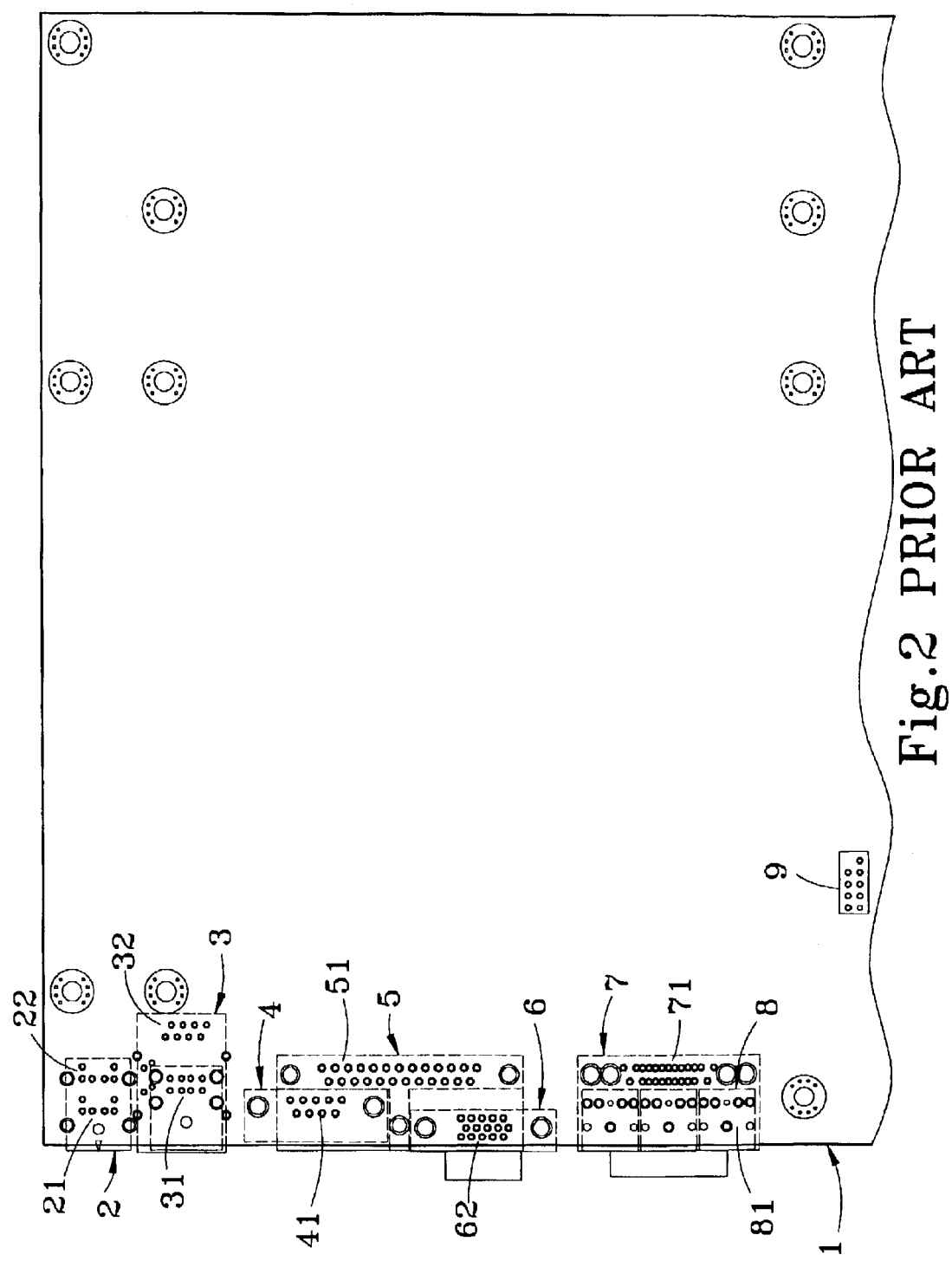
FIG. 2 is a schematic view of another conventional mainboard.
Figure 4:
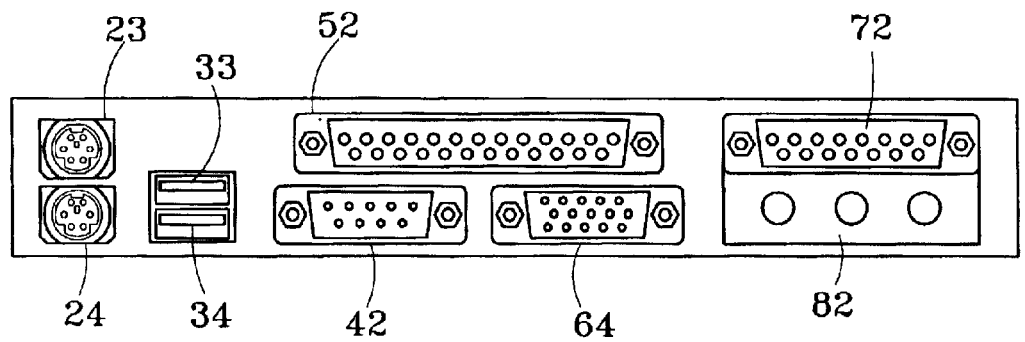
FIG. 4 is a schematic view of the face panel layout of the conventional mainboard shown in FIG. 2.
Figure 3:
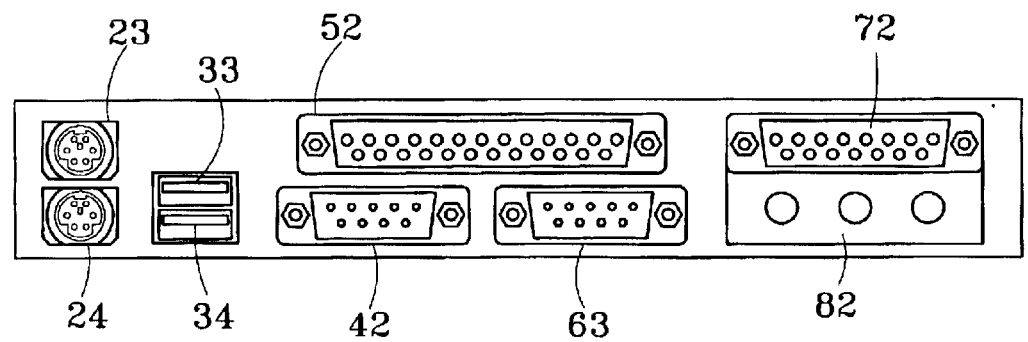
FIG. 3 is a schematic view of the face panel layout of the conventional mainboard shown in FIG. 1.

Referring to FIGS. 5, 6 and 7, the main improvement of the invention is on the specific area 6 of the mainboard 1. The specific area 6 consists of two different jack layouts 61 and 62 formed in a juxtaposed manner to enable designers to selectively connect a COM jack terminal 63 or a VGA jack terminal 64 for a display device. As present conventional mainboards 1 have two types of specifications. The first type of mainboard 1 does not have VGA display card (built-in image) functions (as shown in FIG. 1) and designers have to directly connect the COM2 jack terminal 63 on the specific area 6, while another type of mainboard 1 includes the VGA display card (built-in image) functions and designers may directly connect the display device jack terminal 64 on the specific area 6 (as shown in FIG. 2). Hence two different specifications of mainboards 1 are needed. Manufacturers have to produce two different specifications of mainboard 1 to meet user requirements. As a result, production cost is higher.

If the COM2 jack terminal 63 and the VGA jack terminal 64 are connected to the same mainboard 1 at the same time, the jack panel of the mainboard 1 does not have enough space to accommodate another set of jack terminal, or the jack panel surface area must be increased to accommodate another set of jack terminal. This will cause design alteration of the casing for the mainboard. And the circuitry on mainboard also has to be redesigned. This will incur significant cost increase. Manufacturing also becomes more difficult.

Therefore the invention combines two different sets jack layouts 61 and 62 on the specific area 6 of the mainboard 1 to enable manufacturers to selectively connect the COM2 jack terminal 63 or the VGA jack terminal 64 according to requirements. Thus manufacturers need only to produce one type of mainboard 1. Production cost can be greatly reduced.

Figure 8:
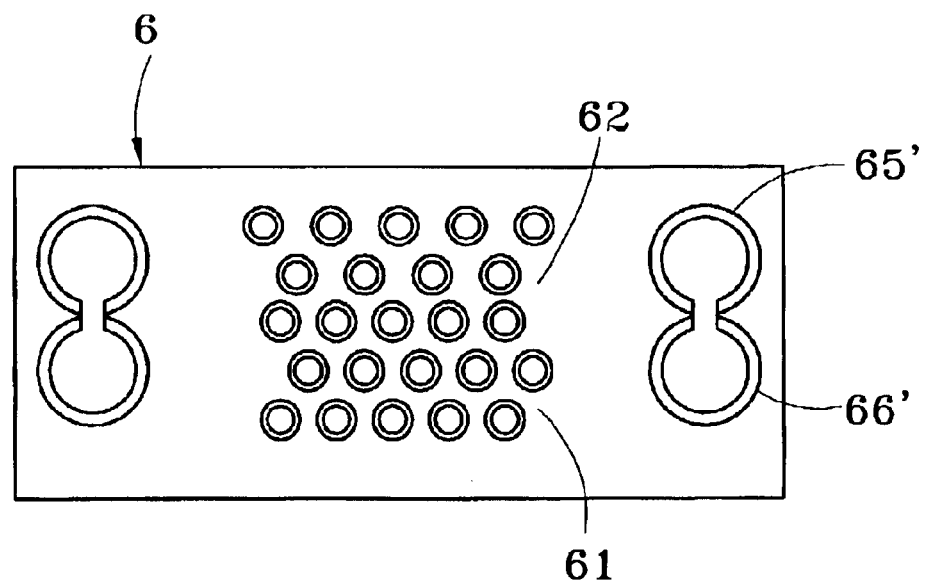
FIG. 8 is a schematic view of another embodiment according to FIG. 7.

Refer to FIG. 8 for another embodiment of the invention. On two sides of the two sets of jack layouts 61 and 62 on the specific area 6, there are respectively two grounding connection points 65 and 66 that can prevent the jack terminals 63 and 64 from being affected by EMI during data transmission. The two grounding connection points 65 and 66 may be integrally made with a notch formed on the connection juncture to save production cost.

Figure 9:
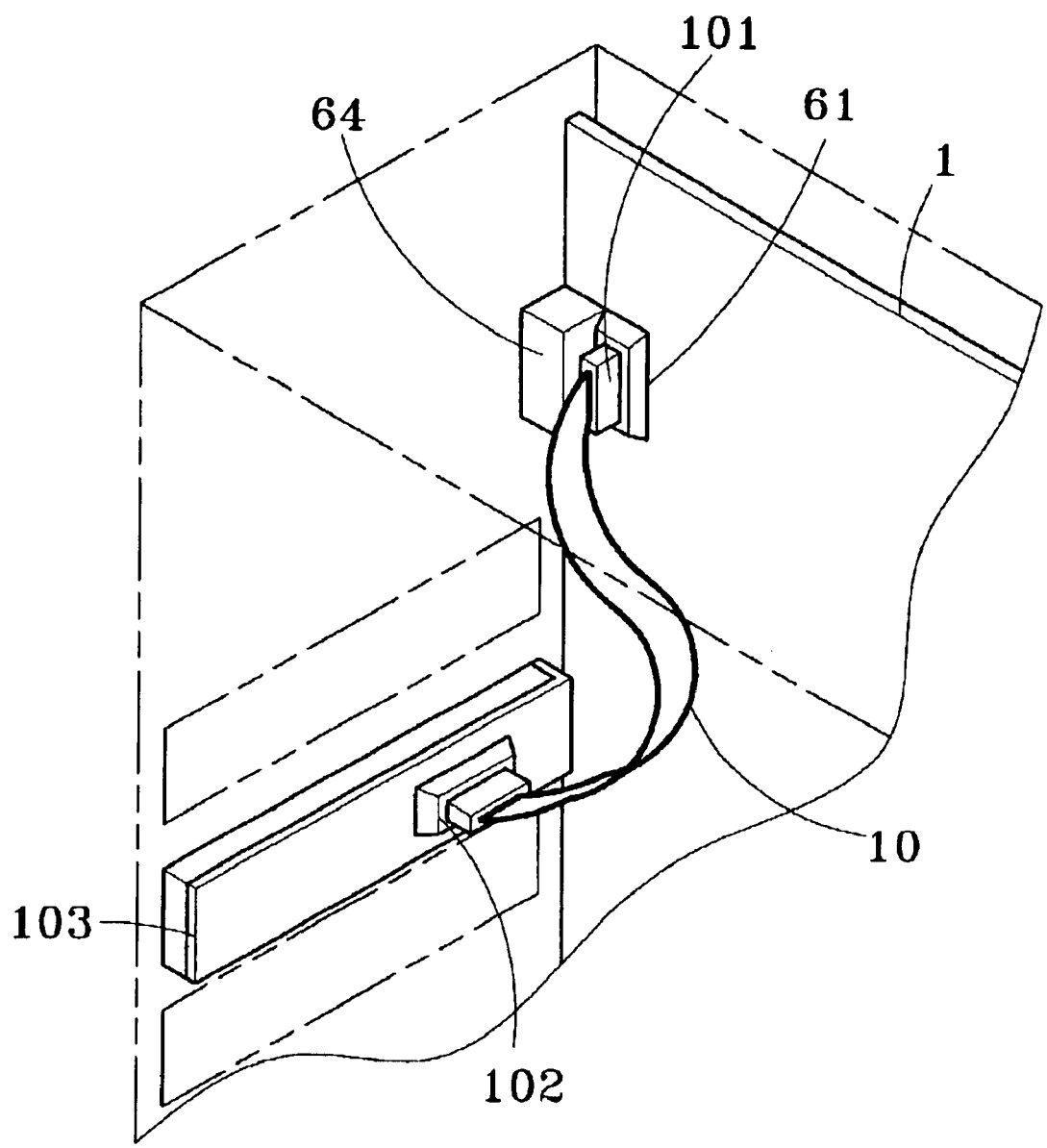
FIG. 9 is a schematic view of another embodiment of the invention.

Refer to FIG. 9 for yet another embodiment of the invention. As shown in the drawing, the mainboard 1 includes VGA display card (built-in image) functions. When the specific area 6 is connected to the jack terminal 64 of the display device, the unused COM port jack layout 61 may be coupled with a serial port flat cable 10. The serial port flat cable 10 has two ends to couple respectively with a COM port terminal 101 and a retain board 103 contained a COM port jack 102. Thus an extra COM serial port may be added and connected to facilitate future computer upgrade or peripheral expansion.

What is claimed is:

1. A mainboard having a selective connection COM/VGA jack layout comprising a specific area for connecting different jack terminals to connect peripheral devices, the specific area including at least two different sets of jack layouts to form a COM port jack layout and a VGA port jack layout in a juxtaposed manner such that the mainboard of one specification is allowed to selectively connect a COM port jack terminal or a VGA port jack terminal.

2. The mainboard of claim 1 further having two grounding connection points located on two sides of the COM port jack layout and the VGA port jack layout for grounding use.

3. The mainboard of claim 1, wherein the COM port jack layout is coupled with a serial port flat cable, the serial port flat cable having two ends to couple respectively a COM port terminal and a retain board contained a COM port jack.

4. The mainboard of claim 1, wherein the mainboard includes a PS2 port connection area, a USB port connection area, two serial port connection areas, a parallel port connection area, a MIDI/GAME port connection area and an audio socket connection area that have different specifications for connecting use.

5. The mainboard of claim 4, wherein the specific area is a serial port connection area to accommodate the COM port jack layout and the VGA port jack layout.

6. The mainboard of claim 4, wherein the number of the specific area is designed according to FLEX-ATX/MICRO-ATX/ATX specifications.

7. The mainboard of claim 6, wherein the two grounding connection points are integrally made with a connection juncture which has a notch formed thereon.

* * * * *